United States Patent
Voigt

(10) Patent No.: US 6,250,687 B1
(45) Date of Patent: Jun. 26, 2001

(54) PROCESS FOR LEAK PROOF CONNECTION OF BRANCH LINES TO REHABILITATED SEWER PIPES

(75) Inventor: Thomas Voigt, Bonn (DE)

(73) Assignee: Trolining GmbH, Troisdorf (DE)

( * ) Notice: Subject to any disclaimer, the term of this patent is extended or adjusted under 35 U.S.C. 154(b) by 0 days.

(21) Appl. No.: 09/180,016
(22) PCT Filed: Apr. 29, 1997
(86) PCT No.: PCT/DE97/00881
  § 371 Date: Dec. 16, 1998
  § 102(e) Date: Dec. 16, 1998
(87) PCT Pub. No.: WO97/41381
  PCT Pub. Date: Nov. 6, 1997

(30) Foreign Application Priority Data

Apr. 30, 1997 (DE) .............................. 196 17 329

(51) Int. Cl.[7] .................................................. F16L 11/04
(52) U.S. Cl. .................... 285/55; 285/21.2; 285/197; 156/292; 156/273.9
(58) Field of Search ................... 285/197, 21.1, 285/21.2, 133.21, 133.5; 156/293, 273.9; 219/544, 545

(56) References Cited

U.S. PATENT DOCUMENTS

| | | | |
|---|---|---|---|
| 4,894,521 | * | 1/1990 | Evans ................................ 285/21.2 |
| 5,104,468 | * | 4/1992 | de Jong ............................... 285/21.2 |
| 6,089,615 | * | 7/2000 | Jappinen ............................. 285/21.2 |

FOREIGN PATENT DOCUMENTS

| | | | |
|---|---|---|---|
| 4207038A | | 9/1993 | (DE) . |
| 4410592C | | 6/1995 | (DE) . |
| 565397 | * | 10/1993 | (EP) ...................................... 285/21 |
| 2223550A | | 4/1990 | (GB) . |
| 405248585 | * | 9/1993 | (JP) ...................................... 285/21 |

* cited by examiner

*Primary Examiner*—Eric K. Nicholson
(74) *Attorney, Agent, or Firm*—Millen, White, Zelano & Branigan, P.C.

(57) ABSTRACT

The invention concerns a process for leak proof connection of branch lines such as house lines (1) to main lines such as rehabilitated sewer pipes (2). A lining hose (4) with a flat textile material such as nonwoven fabric, woven cloth, knit fabric, mesh fabric or laminate, which can be soaked in curable liquid resin, is introduced into the feeder line before or after soaking with a resin and its other, collar-shaped expanded end is bonded in the inside of the main line by means of a ring-formed fitting (5) to form a leak proof seal. The ring-formed fitting (5) consists of thermoplastic (7) on one side and of a flat textile material (8) such as nonwoven fabric, woven cloth, knit fabric, mesh fabric or laminate on the other. The ring-formed fitting (5) is welded with the inner thermoplastic surface (6) of the main line, while the flat textile material (8) of the ring-formed fitting (5) is connected with the collar-shaped, expanded end of the lining hose (4) by gluing.

5 Claims, 2 Drawing Sheets

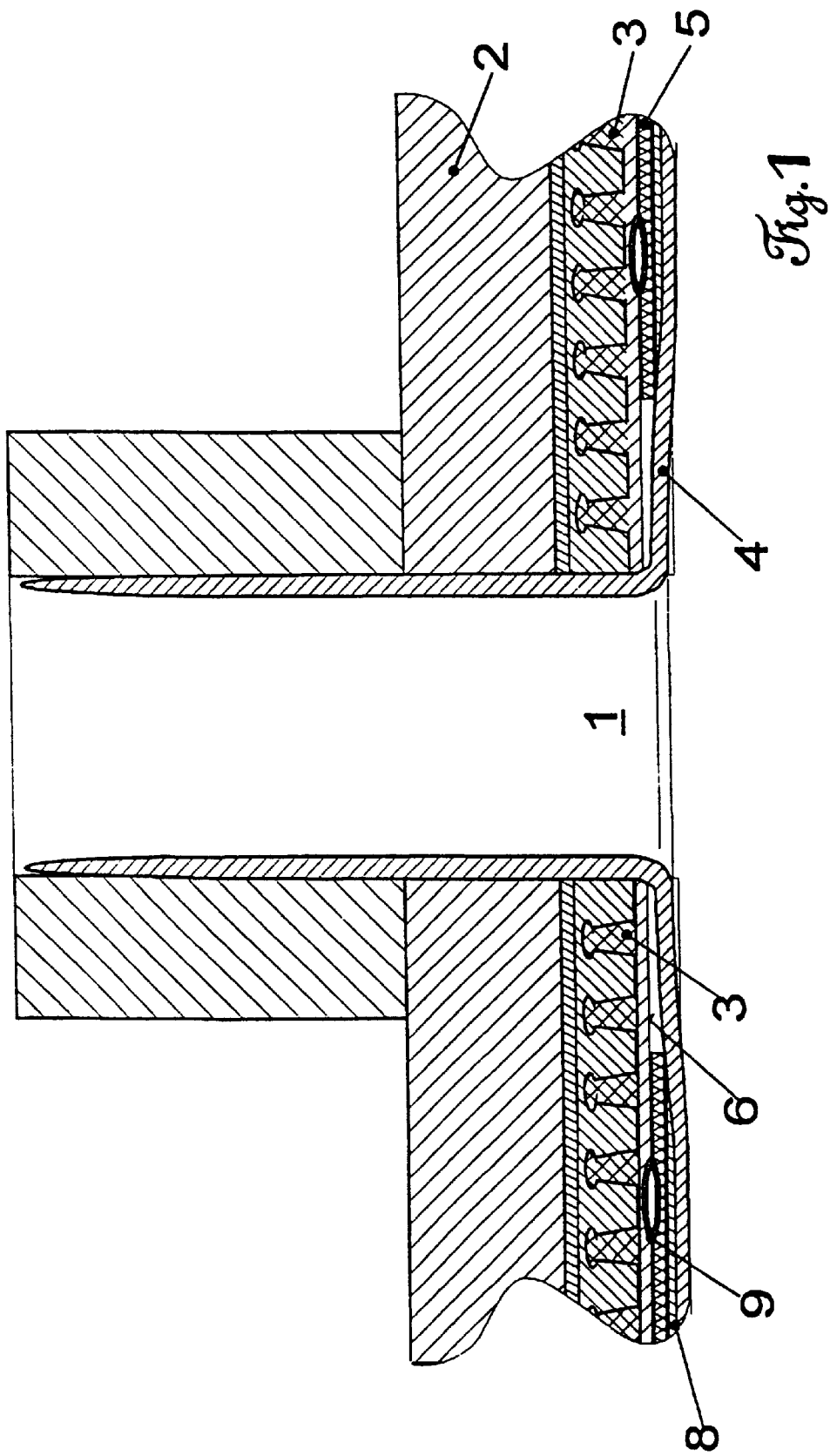

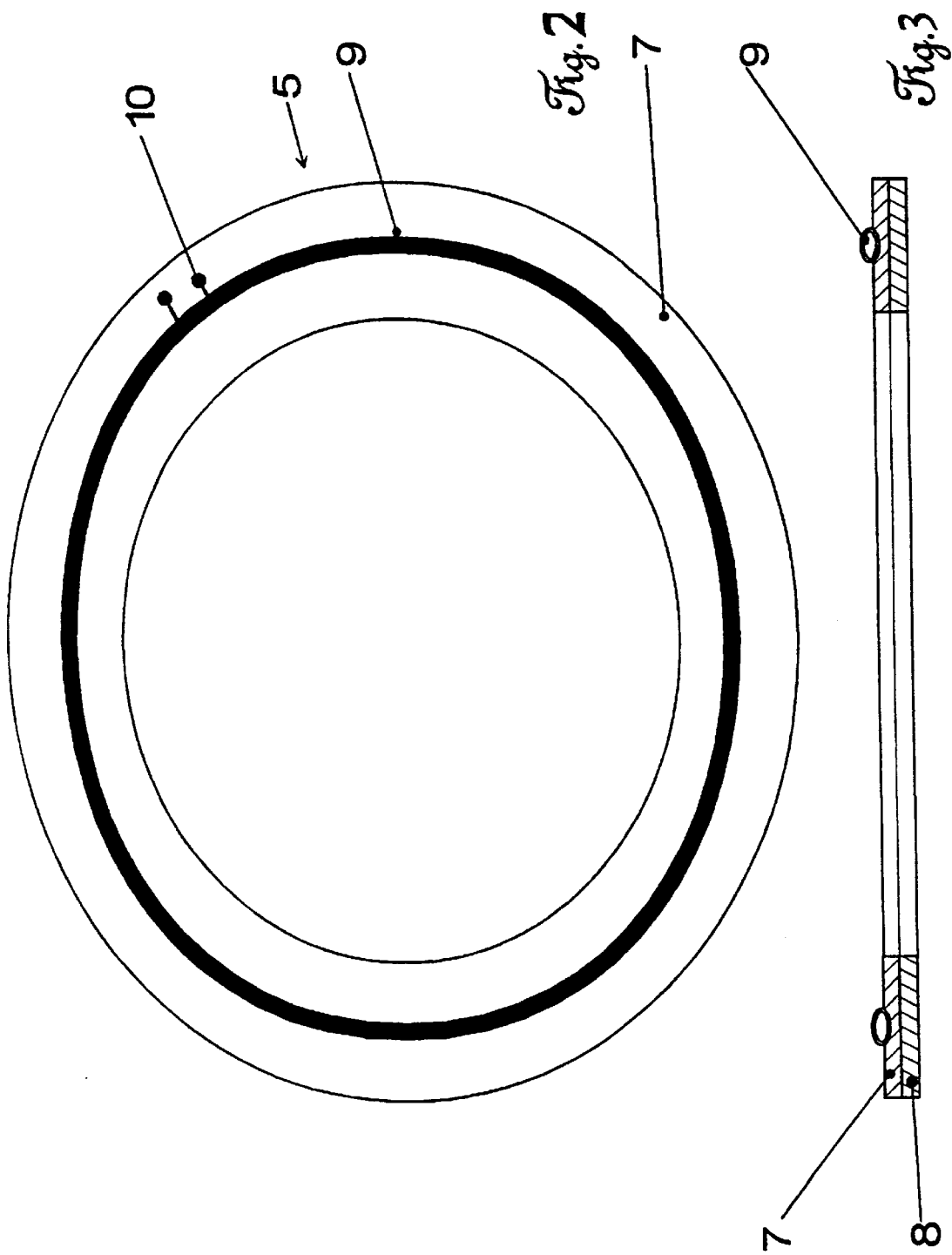

PROCESS FOR LEAK PROOF CONNECTION OF BRANCH LINES TO REHABILITATED SEWER PIPES

TECHNICAL SECTOR

The invention relates to a process for leakproof connection of branch lines, such as house lines, to main lines, such as rehabilitated sewer pipes, in which one part of the length of a lining hose composed of a sheet of textile, such as a nonwoven fabric, woven fabric, knitted fabric, mesh fabric or laminate, and capable of being saturated with a liquid, curable resin, is introduced into the branch line, before or after saturation with a resin, and its other, collar-shaped expanded end is bonded to the inner side of the main line in a leakproof manner. The invention also relates to a transition piece for bonding a resin-saturated textile lining hose onto a surface made from thermoplastic polymer for this process.

PRIOR ART

When damaged pipelines, in particular sewer pipelines for waste water drainage, are rehabilitated by the procedure known as relining, there is the question, after the main line has been rehabilitated, of the leakproof bonding onto this of the branch lines, in particular house lines, which feed into the main lines. DE 39 29 558 A1, DE 42 07 038 A1 and DE 42 38 982 A1 have disclosed a process according to the precharacterizing clause of claim 1. However, a precondition of these processes, which are proven per se, was that the inner surface of the rehabilitated sewer pipe is composed of bondable material, such as cured epoxy resin, to which the collar of the lining hose can be bonded. In many modern relining processes, however, the inner surface of the rehabilitated sewer pipe is composed, because of its superior properties, of polyolefins, in particular HDPE, which cannot be bonded to other materials using conventional adhesives.

DE 44 10 592 C1 discloses a hat-shaped connecting sleeve which is also suitable for leakproof connection of house lines to sewer pipes lined with thermoplastic materials, such as HDPE. This connecting sleeve is composed of a short piece of hose made from extensible, woven . . . .

DE 44 10 592 C1 discloses a hat-shaped connecting sleeve which is also suitable for leakproof connection of house lines to sewer pipes lined with thermoplastic materials, such as HDPE. This connecting sleeve is composed of a short piece of hose made from extensible, woven or knitted base material made from glass fibers, which has been saturated with a curing synthetic resin composition, and of a collar composed of thermoplastic polymer. However, these hat-shaped connecting pieces are complicated to produce, since the woven or knitted base material is composed of glass fibers, which are difficult to bond to the thermoplastic material of the collar. Special robots are required for inserting these connecting pieces, and these again imply high cost.

OBJECT

It is therefore an object of the present invention to provide a process for leakproof connection of branch lines, such as house lines, to main lines, such as rehabilitated sewer pipes and which, on the one hand, is based on the proven principle of a lining hose composed of a sheet of textile and, on the other hand, permits a leakproof bond to the rehabilitated main line's inner surface, composed of thermoplastic material.

THE INVENTION

The invention achieves this object by means of a process in accordance with claim 1, preferably with one or more of the features of the subclaims, and in particular with the aid of a transition piece corresponding to claim 4, particularly preferably combined with one or more of the features of the other subclaims.

This invention is based on a process corresponding to DE-39 29 558 A1 and DE-42 38 982 A1, i.e., use is made of a lining hose, known per se, which is with [sic] resin-saturated and has a collar-shaped expanded end.

To achieve bonding to the main line's thermoplastic inner surface, a preferably ring-shaped transition piece is used. One side of this ring-shaped transition piece is composed of thermoplastic polymer, preferably HDPE, in particular the same material as that used for the inner surface of the rehabilitated sewer pipe. The other surface of the ring-shaped transition piece is composed of a sheet of textile, in particular a fine-thread nonwoven fabric made from polyester fibers, which is, in particular, heat-laminated to the thermoplastic base material of the transition piece.

Depending on the angle at which the branch line diverts, the ring-shaped transition piece used according to the invention may have the shape of a circular ring or a shape which is rather elliptical.

In a preferred embodiment of the invention, the fusing of the thermoplastic polymer of the transition piece to the thermoplastic inner surface of the rehabilitated sewer pipe takes place by means of an electrical heating spiral known per se. For this purpose, the ring-shaped transition piece has for example on its sides appropriate electrical connections to which a commercially available electric welding apparatus can be connected. The welding rate here must be adjusted in such a way that the heating spiral becomes intimately fused to the thermoplastic inner surface of the rehabilitated sewer pipe, thus giving a leakproof bond. For this procedure use is usually made of robots which can also be used in sewer pipes where human access is impossible.

In a preferred embodiment of the invention, the sheet of textile of the ring-shaped transition piece is saturated with curing resin before the bonding to the resin-saturated lining hose, preferably with the same resin as that used to saturate the lining hose. The curing of the resin in the sheet of textile of the ring-shaped transition piece and/or in the lining hose may be initiated, for example, by exposure to UV light, introduction of heat or incorporation of chemically acting crosslinking agents and/or crosslinking accelerators. The result after the resin has cured is leakproof bonding of one end of the lining hose to the house line and of the other end via the transition piece used according to the invention to the thermoplastic surface of the rehabilitated sewer pipe.

In a preferred embodiment of the invention, the transition piece is composed of an HDPE layer of thickness from 0.5 to 4 mm, to the entire surface of which a nonwoven fabric made from polyester fibers has been laminated by heat lamination. The HDPE layer preferably has a heating spiral bonded to it, which in turn may be encapsulated in HDPE.

The invention will be described below using a working example and the drawing.

BRIEF DESCRIPTION OF THE DRAWING

In the drawing,

FIG. 1 shows a section through the upper part of a rehabilitated sewer pipe with house line FIG. 2 shows a plan view of the ring-shaped transition piece, and FIG. 3 shows a section through the ring-shaped transition piece.

BEST METHOD OF CARRYING OUT THE INVENTION

In the working example described below, the starting position is a sewer pipe 2 of nominal width DN 300, into which a house line 1 feeds laterally. The rehabilitation of the sewer pipe 2 is carried out using the so-called TroLining® process in accordance with DE-42 13 068 A1 using an HDPE inliner 3.

After the sewer pipe 2 has been lined with the inliner 3, the junction of the house line 1 is cut out in a manner known per se using a robot. After cleaning of the area on the house line, the transition piece 5 (FIG. 2 and FIG. 3) is firstly introduced into the pipe by means of a robot, and positioned centrally around the house line 1.

The transition piece 5 is stamped out from a 1.5 mm-thick web made from HDPE, the entire surface of which has been laminated to a polyester nonwoven fabric with a weight per unit area of 300 g/m². If the house line 1 feeds into the sewer pipe 2 perpendicularly, the transition piece 5 has approximately the shape of a circular ring. The internal diameter of the transition piece 5, for a diameter of the house line of DN 150, is from about 170 to 200 mm, and the width of the transition piece is about 5 cm.

On its first surface, composed of thermoplastic polymer 7, the transition piece 5 has a heating spiral 9 arranged in the shape of a ring, which has been encapsulated with HDPE in a manner known per se. The connection to a commercially available welding device, for applying the energy required for the fusion procedure takes place via the connector contacts 10 (FIG. 2).

The sheet 8 of textile is saturated with curable resin before or after the transition piece 5 is fused onto the inliner 3.

After leakproof bonding of the transition piece 5 to the thermoplastic surface 6 of the inliner 3, the resin-saturated lining hose 4 is introduced in a known manner, for example in accordance with DE-39 29 558 A1. In the working example described, a resin-saturated glass-fiber stocking is used as lining hose 4, and the curing is initiated using UV light.

| Key | |
|---|---|
| 1 | House line |
| 2 | Sewer pipe |
| 3 | Inliner |
| 4 | Lining hose |
| 5 | Transition piece |
| 6 | Surface |
| 7 | Thermoplastic polymer |
| 8 | Sheet of textile |
| 9 | Heating spiral |
| 10 | Connector contacts |

What is claimed is:

1. A process for leakproof connection of branch lines, such as house lines (1), to main lines, such as rehabilitated sewer pipes (2), in which one part of the length of a lining hose (4) composed of a sheet of textile, such as a nonwoven fabric, woven fabric, knitted fabric, mesh fabric or laminate, and capable of being saturated with a liquid, curable resin, is introduced into the branch line, before or after saturation with a resin, and its other, collar-shaped expanded end is bonded to the inner side of the main line in a leakproof manner, characterized in that the collar-shaped expanded end of the textile lining hose (4) is bonded with the aid of a ring-shaped transition piece (5) to an inner surface of the inner side of the main line, said inner surface (6) being composed of thermoplastic polymer, where an upper side of the ring-shaped transition piece (5) is composed of thermoplastic polymer (7), and a lower side of the ring-shaped transition piece (5) comprises a sheet (8) of textile, such as a nonwoven fabric, woven fabric, mesh fabric or laminate, the ring-shaped transition piece (5) is fused to the inner thermoplastic surface (6) of the main line, and the sheet (8) of textile of the ring-shaped transition piece (5) is bonded by gluing to the collar-shaped expanded end of the lining hose (4).

2. A process according to claim 1, characterized in that the fusing of the ring-shaped transition piece (5) to the inner surface of the inner side of the main line, said inner surface (6) being composed of thermoplastic polymer, takes place by means of a heating spiral (9) which is heated electrically.

3. A process according to claim 1, characterized in that the sheet (8) of textile of the ring-shaped transition piece (5) is saturated with curing resin before the bonding of the lining hose (4).

4. Process according to claim 2, characterized in that the sheet (8) of the textile of the ring-shaped transition piece (5) is saturated with curing resin before the bonding of the lining hose (4).

5. A transition piece (5) suitable for bonding a resin-saturated textile lining hose (4) onto a surface (6) made of thermoplastic polymer (7), said transition piece comprising a layer of high density polyethylene (HDPE) having a thickness of from 0.5 to 4 mm, a nonwoven polyester fabric heat laminated to the entire surface of said HDPE layer, and a heating spiral (9) bonded to the HDPE layer, said transition piece (5) being ring-shaped.

* * * * *

UNITED STATES PATENT AND TRADEMARK OFFICE
CERTIFICATE OF CORRECTION

PATENT NO. : 6,250,687 B1
DATED : June 26, 2001
INVENTOR(S) : Voigt

It is certified that error appears in the above-identified patent and that said Letters Patent is hereby corrected as shown below:

<u>Title page,</u>
Item [30], Foreign Application Priority Data please correct the date from "April 30, 1997" to read as -- April 30, 1996 --

<u>Column 4,</u>
Line 12, delete "such as a nonwoven";
Line 13, delete "fabric, woven fabric, knitted fabric, mesh fabric or laminate,";
Line 14, delete "and";
Line 27, delete "such as a nonwoven";
Line 28, delete "fabric, woven fabric, mesh fabric or laminate,"; and
Line 56, insert the following claim:
-- 6. A process according to claim 1, wherein said sheet of textile is a non-woven fabric, woven fabric, knitted fabric, mesh fabric or laminate. --

Signed and Sealed this

Twenty-ninth Day of April, 2003

JAMES E. ROGAN
*Director of the United States Patent and Trademark Office*